(12) United States Patent
Lion

(10) Patent No.: US 8,616,900 B1
(45) Date of Patent: Dec. 31, 2013

(54) DISK DRIVE HAVING A TOP COVER WITH AN ELECTRICAL CONNECTOR LATCH

(75) Inventor: Robert N. Lion, Redwood City, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 300 days.

(21) Appl. No.: 13/010,491

(22) Filed: Jan. 20, 2011

(51) Int. Cl.
*H01R 12/00* (2006.01)

(52) U.S. Cl.
USPC .......................................................... 439/76.1

(58) Field of Classification Search
USPC ................... 439/76.1; 361/752, 736; 360/316
See application file for complete search history.

(56) References Cited

U.S. PATENT DOCUMENTS

| | | | |
|---|---|---|---|
| 5,881,454 A * | 3/1999 | Baxter et al. | 29/843 |
| 6,097,608 A * | 8/2000 | Berberich et al. | 361/752 |
| 6,764,344 B2 * | 7/2004 | Maiers | 439/629 |
| 6,811,427 B2 | 11/2004 | Garrett et al. | |
| 6,832,929 B2 | 12/2004 | Garrett et al. | |
| 6,839,237 B2 * | 1/2005 | Berry et al. | 361/727 |
| 6,884,085 B1 | 4/2005 | Goldstone | |
| 6,908,330 B2 | 6/2005 | Garrett et al. | |
| 6,934,126 B1 | 8/2005 | Berding et al. | |
| 7,322,836 B2 | 1/2008 | Shun et al. | |
| 7,324,308 B2 * | 1/2008 | Kimura et al. | 360/316 |
| 7,335,048 B1 | 2/2008 | Chen et al. | |
| 7,367,827 B2 | 5/2008 | Chen | |
| 7,660,131 B2 | 2/2010 | Drouillard et al. | |
| 2001/0049210 A1 * | 12/2001 | Pinteric et al. | 439/76.1 |
| 2002/0055292 A1 * | 5/2002 | Maiers et al. | 439/378 |
| 2010/0003844 A1 | 1/2010 | Chen et al. | |

FOREIGN PATENT DOCUMENTS

WO 2008109612 A1 9/2008

OTHER PUBLICATIONS http://www.cooldrives.com/saiandsaiiin.html, downloaded on Jan. 19, 2011.

* cited by examiner

*Primary Examiner* — Phuong Dinh

(57) ABSTRACT

A disk drive, for electrical coupling to a host electrical connector of a host electronic system, includes a disk drive base. A top cover is attached to the disk drive base and a disk is rotably attached to the disk drive base. The top cover and the disk drive base together enclose the disk. A disk drive printed circuit board is also attached to the disk drive base. The disk drive printed circuit board includes a disk drive electrical connector. The disk drive electrical connector is configured to mate with the host electrical connector. The top cover includes a latching feature to retain the host electrical connector.

13 Claims, 4 Drawing Sheets

DISK DRIVE HAVING A TOP COVER WITH AN ELECTRICAL CONNECTOR LATCH

BACKGROUND

Information storage devices are used to retrieve and/or store data for computer systems and other host electronic systems, such as digital video recorders and other consumer electronics products. A magnetic hard disk drive is an example of an information storage device.

Many information storage devices are housed within the system for which they retrieve and/or store data. For example, so-called "internal" disk drives are housed within a host computer system for which they store data. Other information storage devices are not housed within the system for which they retrieve and/or store data. For example, a so-called "external" hard disk drive includes its own housing, which may provide electromagnetic shielding, vibration dampening, some degree of isolation from external mechanical shocks, and active or passive cooling.

Whether an information storage device is external or internal to a host electronic system, the information storage device must include an electrical coupling to communicate with that host electronic system. Such electrical coupling has followed several industry standards over the years. For example, information storage devices have been coupled to host electronic systems in the past via several different standard electronic interfaces, some latter ones representing incremental advancements over previous ones. Examples of past and contemporary interface standards for coupling a disk drive to a host electronic system include: the Integrated Drive Electronics (IDE) interface, the Enhanced IDE (EIDE) interface, the Advanced Technology Attachment Packet Interface (ATAPI), the Serial Advanced Technology Attachment (SATA) interface, the Parallel Advanced Technology Attachment (PATA) interface, the Small Computer System Interface (SCSI), or the Serial Attached SCSI (SAS) interface.

According to each of these standards and others, the information storage device includes an electrical connector to which a host electrical connector is mated and must remain mated during operation. Each such electrical connector typically includes many distinct electrical conductors, often in the form of conductive pins or conductive receptacles (for pins), with electrically insulative material or space between each. Friction may not reliably prevent separation of the electrical connectors after mating, so the electrical connectors may also include one or more conventional sub-structures to enable one connector to retain a mated connector after they are mated together. Hence, considering the many pins, required insulation, and retention sub-structures (if any), contemporary disk drive electrical connectors for coupling to a host electronic system may have considerable size.

As disk drives become smaller, the space or volume taken by the disk drive electrical connector (to enable mating with and retention of a standard host electrical connector) has become a larger percentage of the total volume or space within the disk drive form factor limits. That volume or space could otherwise be used to enhance the capacity or performance of the disk drive. Thus, there is a need in the art for a disk drive design with a simplified or smaller disk drive electrical connector, where the disk drive is nevertheless able to mate with and retain a standard host electrical connector.

DETAILED DESCRIPTION OF EXAMPLE EMBODIMENTS

Figure 1:
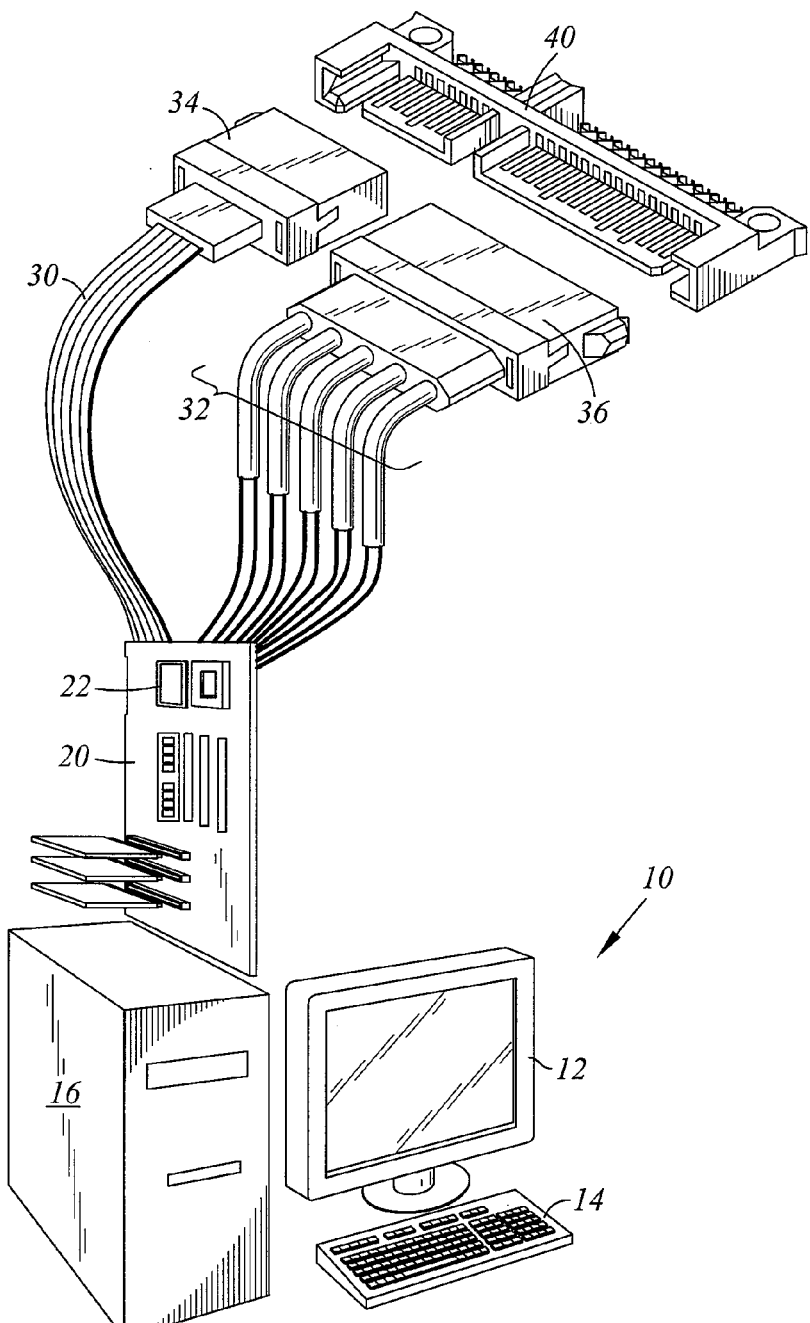
FIG. 1 is a partially exploded schematic representation of a conventional host electronic system with electrical coupling for an information storage device.

FIG. 1 is a partially exploded schematic representation of a conventional host electronic system 10 with electrical coupling for an information storage device. The host electronic system 10 includes a host system printed circuit board (PCB) 20 to which a host processor 22 is attached. The host system printed circuit board (PCB) 20 and host processor 22 may optionally be enclosed in a housing 16. The host electronic system 10 may be a conventional personal computer system, for example, in which case the host system PCB 20 may be a conventional motherboard, and the host processor 22 may be a conventional central processing unit (CPU). Such a host electronic system 10 may optionally include a user interface 12, 14. Alternatively, the host electronic system may be a digital video recorder, in which case the host system PCB would include conventional circuitry for communication of video information.

The conventional host electronic system 10 may also include host cables 30, 32 extending from the host system PCB 20. The host cables 30, 32 are shown in FIG. 1 to include host electrical connectors 34, 36, respectively. The host electrical connectors 34, 36 may comply with the SATA interface standard, (i.e. so-called SATA connectors), for example. The host electrical connectors 34, 36 may alternatively comply with other industry standards (e.g. PATA, SCSI, SAS). As shown in FIG. 1, an information storage device electrical connector 40 may be configured to mate with the host electrical connectors 34, 36.

Figure 2:
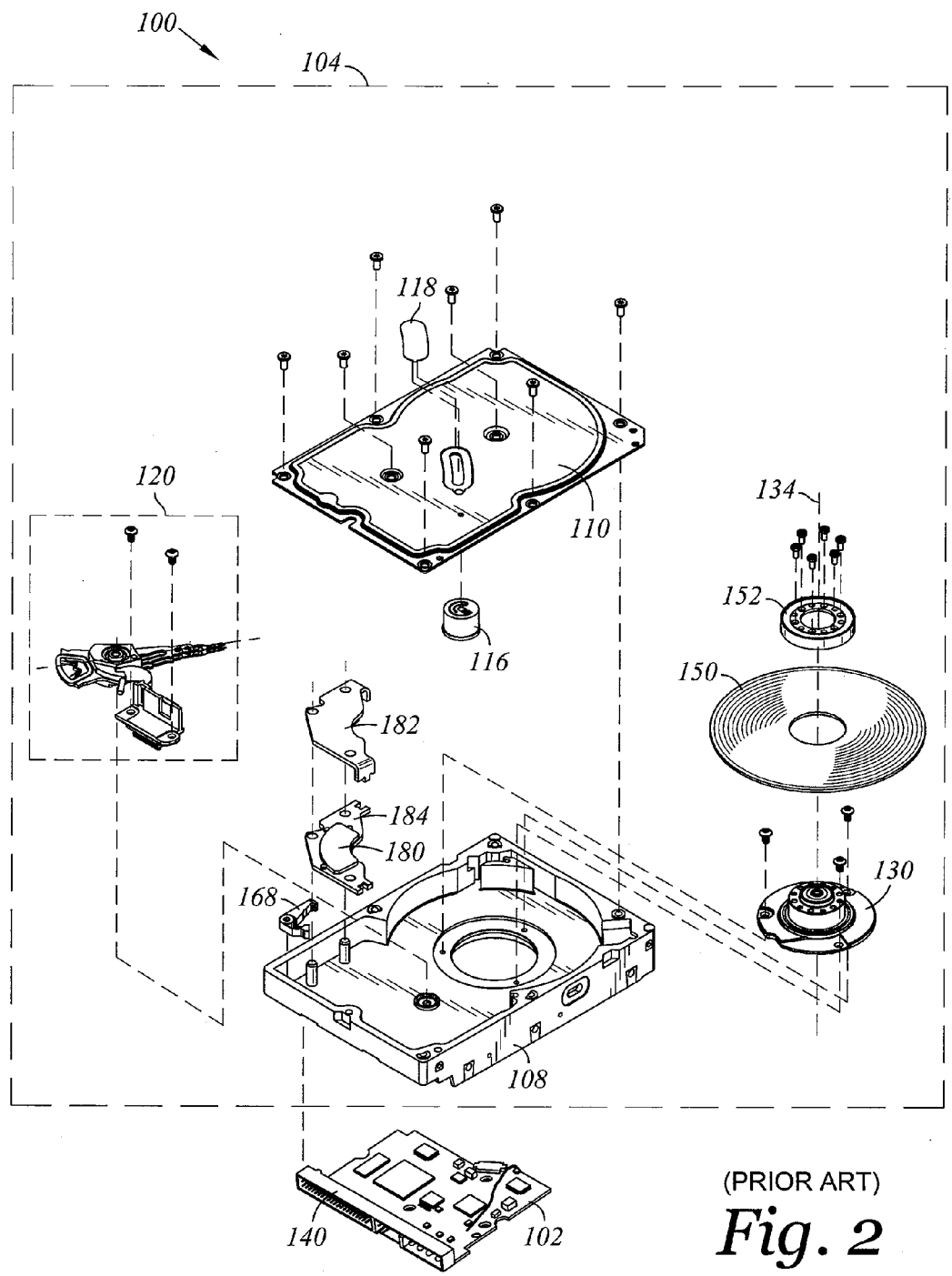
FIG. 2 is an exploded top perspective view of a conventional disk drive with electrical coupling for a host electronic system.

FIG. 2 is an exploded top perspective view of a conventional disk drive information storage device 100 with electrical coupling for a host electronic system. The disk drive 100 includes a head disk assembly (HDA) 104 and a disk drive printed circuit board (PCB) 102. The disk drive PCB 102 includes conventional circuitry for processing signals and controlling the operations of the disk drive 100. The disk drive PCB also includes a disk drive electrical connector 140 that is configured to mate with a host electrical connector of a host electronic system. The disk drive electrical connector 140 may be a SATA, PATA, SCSI, or SAS compliant connector, for example.

In FIG. 2, the HDA 104 is shown to include a base 108 and a top cover 110 attached to the base 108 to collectively house at least one disk 150, a spindle 130 attached to the base 108 for rotating disk 150, and a head stack assembly (HSA) 120 rotatably attached to the base 108. The disk 150 may be mounted to the spindle 130 by a conventional disk clamp 152. The spindle 130 may rotate the disk 150 at a constant angular velocity about a spindle rotation axis 134.

The HSA 120 includes one or more heads (not visible on the scale of FIG. 2) for writing and reading data to and from the disk 150. In magnetic recording hard disk drive applications, the head may include a magneto resistive sensor for reading data from disk 150, and a longitudinal or perpendicular type inductive transducer for writing data to disk 150. In optical or magneto-optical recording applications, the head may include an objective lens for focusing laser light upon the recording media surface.

The disk drive 100 of FIG. 2 may include voice coil motor (VCM) top and bottom yoke plates 182, 184 mounted to the base 108. One or both of the VCM yoke plates may include a permanent magnet (e.g. permanent magnet 180). The VCM yoke plates 182, 184 may carry magnetic flux from the permanent magnet(s) 180. A coil of the HSA 120 may be disposed between the top and bottom VCM yoke plates 182 and 184 to cause rotation of the HSA 120 about a pivot axis that is parallel to the spindle rotational axis 134. In this way, the head(s) of the HSA 120 may be controllably positioned relative to the disk 150 for writing and/or reading data. The angular range of HSA pivoting may be limited by one or more stops, and the HSA may be held adjacent a stop by a latch (e.g. actuator latch 168).

The disk drive 100 may be of various sizes or "form factors." For example, the disk drive may be a so-called 3.5" form-factor disk drive, a 2.5" form factor disk drive, or a 1.8" form factor disk drive, among others. The storage capacity of the disk drive 100 may be increased by the use of additional disks and by the HSA 120 having correspondingly more heads supported by multiple actuator arms. The top cover 110 may include an opening for a breather filter 116 and a covering 118 for a larger opening for use in servo writing the disk 150. The base 108 may be attached to the top cover 110 by means of screws or another conventional fastening method.

Figure 3:
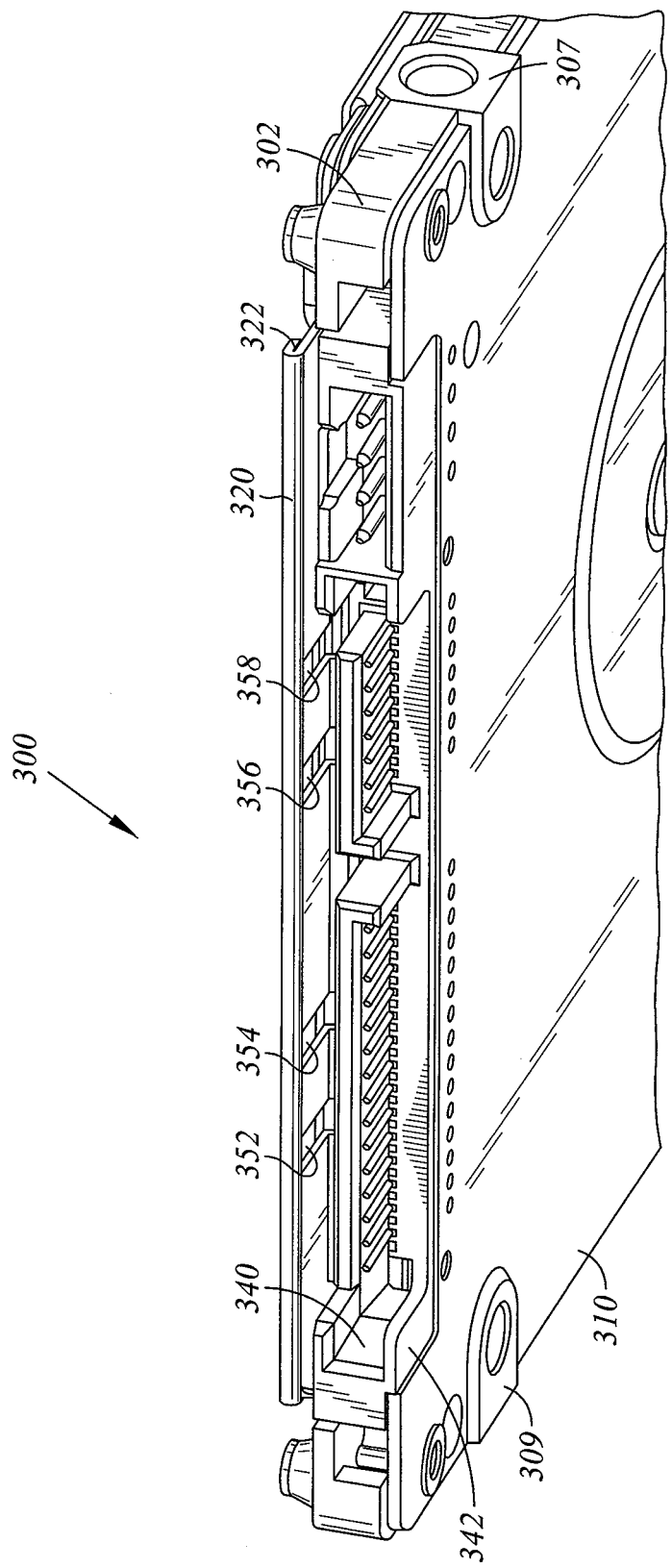
FIG. 3 is an underside end perspective view of a disk drive according to an embodiment of the present invention.

FIG. 3 is an underside end perspective view of a disk drive 300 according to an embodiment of the present invention. The disk drive 300 includes a disk drive base 302, and a disk drive PCB 310 that is attached to the disk drive base 302 (e.g. by one or more conventional screws). The disk drive base 302 may comprise cast aluminum, iron, or formed sheet steel, for example. The disk drive 300 may be mounted into a chassis of the host electronic system by attachment at mounting features 307 and 309. Mounting features 307 and 309 may be positioned on the disk drive base 302 according to disk drive form-factor specifications.

In the embodiment of FIG. 3, the disk drive 300 also includes a top cover 320 that is attached to the disk drive base 302, and that, together with the disk drive base 302, encloses a disk. The disk drive top cover 320 may comprise aluminum or stainless steel, for example. The disk drive PCB 310 includes a disk drive electrical connector 340 configured to mate with a host electrical connector. The disk drive electrical connector 340 may be a SATA, PATA, SCSI, or SAS compliant connector, for example. The disk drive electrical connector 340 may include a plastic connector housing 342.

In the embodiment of FIG. 3, the disk drive top cover 320 includes a plurality of latching features 352, 354, 356, 358 to retain the host electrical connector after it is mated with the disk drive electrical connector 340. In the embodiment of FIG. 3 the plurality of latching features 352, 354, 356, 358 comprise recesses in or holes through the disk drive top cover 320, adjacent a fold 322 in the disk drive top cover 320, and overlying the disk drive electrical connector 340. The fold 322 is optional, and may be included or omitted depending on the thickness of the material selected for the disk drive top cover 320, the mechanical stiffness required in the design, and/or other factors. Note that, in the embodiment of FIG. 3, the disk drive top cover 320 and the latching features 352, 354, 356, 358 are preferably a single monolithic component with material continuity, rather than being an assembly of sub-components. Alternatively, a separate latching feature sub-component may be added to the disk drive top cover 320.

Figure 4:
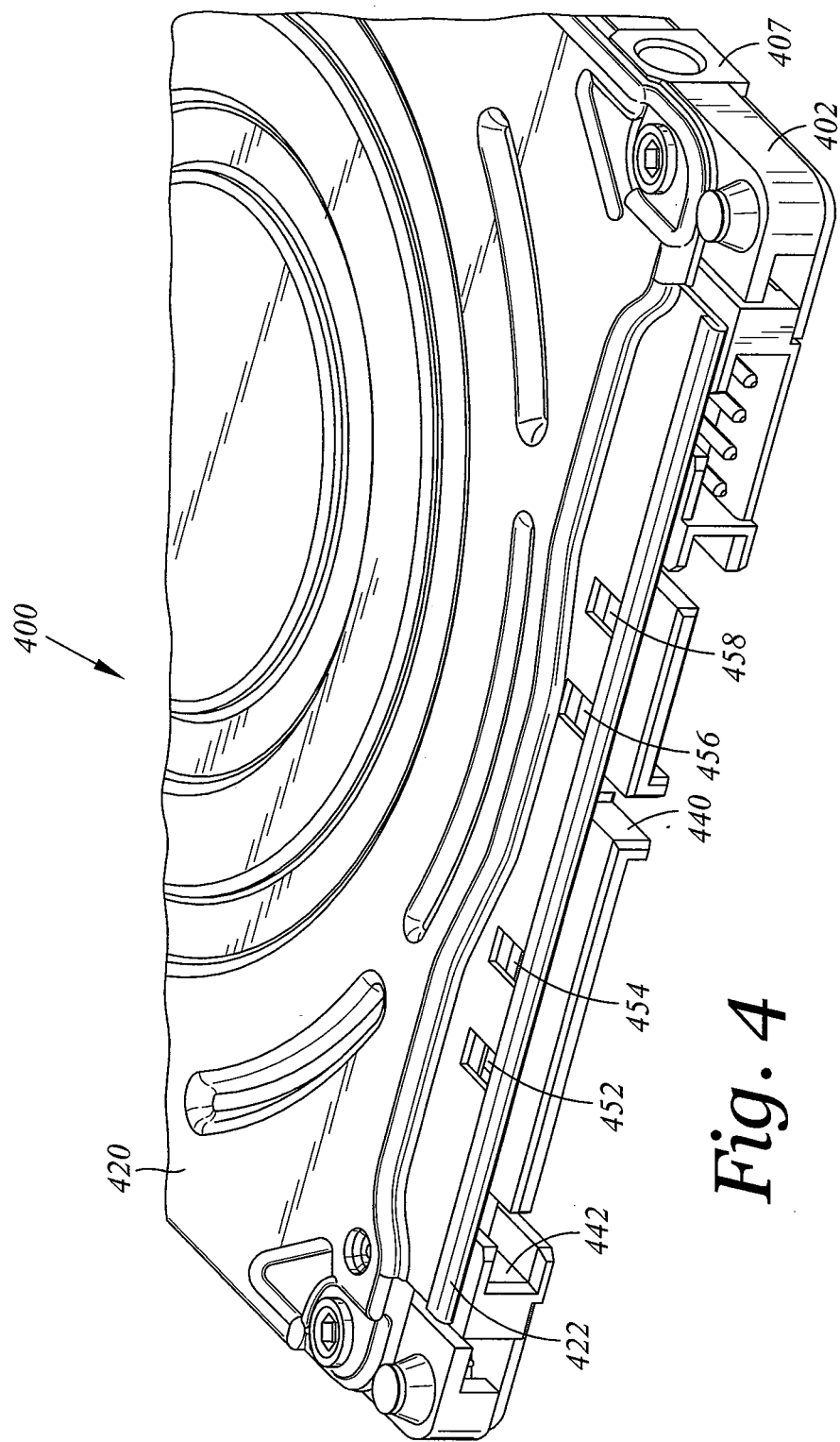
FIG. 4 is a top end perspective view of a disk drive according to an embodiment of the present invention.

FIG. 4 is a top end perspective view of a disk drive 400 according to an embodiment of the present invention. The disk drive 400 includes a disk drive base 402, and a disk drive PCB that is attached to the disk drive base 402. The disk drive base 402 may comprise cast aluminum, iron, or formed sheet steel, for example. The disk drive 400 may be mounted into a chassis of the host electronic system, and attached, for example at a mounting feature 407. Mounting feature 407 may be positioned on the disk drive base 402 according to disk drive form-factor specifications.

In the embodiment of FIG. 4, the disk drive 400 also includes a top cover 420 that is attached to the disk drive base 402, and that, together with the disk drive base 402, encloses a disk. The disk drive top cover 420 may comprise aluminum or stainless steel, for example. The disk drive PCB includes a disk drive electrical connector 440 configured to mate with a host electrical connector. The disk drive electrical connector 440 may be a SATA, PATA, SCSI, or SAS compliant connector, for example. The disk drive electrical connector 440 may include a plastic connector housing 442.

In the embodiment of FIG. 4, the disk drive top cover 420 includes a plurality of latching features 452, 454, 456, 458 to retain the host electrical connector after it is mated with the disk drive electrical connector 440. In the embodiment of FIG. 4 the plurality of latching features 452, 454, 456, 458 comprise recesses in or holes through the disk drive top cover 420, adjacent a fold 422 in the disk drive top cover 420. Note that, in the embodiment of FIG. 4, the disk drive top cover 420 and the latching features 452, 454, 456, 458 are preferably a single monolithic component with material continuity, rather than being an assembly of sub-components. Alternatively, a separate latching feature sub-component may be added to the disk drive top cover 420.

In the embodiment of FIG. 4, latching features 452, 454, 456, 458 may enable the disk drive 400 to retain a host electrical connector after it is mated together with the disk drive electrical connector 440, more securely and reliably than mere friction. Since the latching features 452, 454, 456, 458 pertain to the disk drive cover 420 rather than to the disk drive electrical connector housing 442, the latching features 452, 454, 456, 458 advantageously may not add to the size of the disk drive electrical connector 440. Where the disk drive 400 is of a relatively smaller form factor (e.g. 1.8" or 2.5" form factor), the space or volume taken by the disk drive electrical connector 440 (to enable mating with and retention of a standard host electrical connector) may be a larger percentage of the total volume or space within the form factor limits of the disk drive 400. Such volume or space might otherwise be used to enhance the capacity or performance of the disk drive 400. Hence an advantage of latching features 452, 454, 456, 458 may be even more considerable in smaller form factor disk drives.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base;
   a disk rotably attached to the disk drive base;
   a top cover attached to the disk drive base, the top cover and the disk drive base together enclosing the disk; and a disk drive printed circuit board attached to the disk drive base, the disk drive printed circuit board including a disk drive electrical connector;

wherein the top cover includes a recess that overlies the disk drive electrical connector.

2. The disk drive of claim 1 wherein the disk drive electrical connector is a SATA connector.

3. The disk drive of claim 1 wherein the top cover includes a fold adjacent the recess.

4. The disk drive of claim 1 wherein the recess is a hole through the top cover.

5. The disk drive of claim 1 wherein the recess is one of a plurality of recesses in the top cover that overlie the disk drive electrical connector.

6. The disk drive of claim 1 wherein the top cover comprises stainless steel, and the disk drive electrical connector comprises a plastic connector housing.

7. A host electronic system comprising:
a host system printed circuit board;
a host processor attached to the host system printed circuit board;
a host cable extending from the host system printed circuit board, the host cable including a host electrical connector; and
a disk drive, the disk drive including
a disk drive base;
a disk rotably attached to the disk drive base;
a top cover attached to the disk drive base, the top cover and the disk drive base together enclosing the disk; and
a disk drive printed circuit board attached to the disk drive base, the disk drive printed circuit board including a disk drive electrical connector, the disk drive electrical connector in a mated position with respect to the host electrical connector;

wherein the top cover includes a recess that overlies the disk drive electrical connector.

8. The host electronic system of claim 7 wherein the host electrical connector is a SATA connector.

9. The host electronic system of claim 7 wherein the top cover includes a fold adjacent the recess.

10. The host electronic system of claim 7 wherein the recess is a hole through the top cover.

11. The host electronic system of claim 7 wherein the recess is one of a plurality of recesses in the top cover that overlie the disk drive electrical connector.

12. The host electronic system of claim 7 wherein the top cover comprises stainless steel, and the disk drive electrical connector comprises a plastic connector housing.

13. The host electronic system of claim 7, wherein the host electronic system is a personal computer system, and the host system printed circuit board is a CPU motherboard.

\* \* \* \* \*